(12) United States Patent
Eckert et al.

(10) Patent No.: US 10,576,949 B2
(45) Date of Patent: Mar. 3, 2020

(54) TRACTOR PROTECTION VALVE ASSEMBLY AND ELECTRO-PNEUMATIC BRAKE SYSTEM OF A TRACTOR VEHICLE

(71) Applicant: WABCO Europe BVBA, Brussels (BE)

(72) Inventors: Horst Eckert, Rehburg-Loccum (DE); Florian Schwagmeyer, Heuerßen (DE)

(73) Assignee: WABCO Europe BVBA, Brussels (BE)

( * ) Notice: Subject to any disclaimer, the term of this patent is extended or adjusted under 35 U.S.C. 154(b) by 205 days.

(21) Appl. No.: 15/596,158

(22) Filed: May 16, 2017

(65) Prior Publication Data

US 2018/0334151 A1    Nov. 22, 2018

(51) Int. Cl.
| | |
|---|---|
| *B60T 8/17* | (2006.01) |
| *B60T 7/20* | (2006.01) |
| *B60T 13/68* | (2006.01) |
| *B60T 13/26* | (2006.01) |
| *B60T 8/00* | (2006.01) |
| *B60T 15/20* | (2006.01) |
| *B60T 8/32* | (2006.01) |
| *B60T 7/22* | (2006.01) |

(52) U.S. Cl.
CPC .............. *B60T 8/1708* (2013.01); *B60T 7/20* (2013.01); *B60T 8/00* (2013.01); *B60T 8/323* (2013.01); *B60T 13/268* (2013.01); *B60T 13/683* (2013.01); *B60T 15/203* (2013.01); *B60T 7/22* (2013.01); *B60T 8/327* (2013.01); *B60T 2201/022* (2013.01); *B60T 2201/024* (2013.01); *B60T 2230/06* (2013.01)

(58) Field of Classification Search
CPC ...... B60T 8/1708; B60T 8/1887; B60T 8/323; B60T 13/683; B60T 2201/022; B60T 2201/024
See application file for complete search history.

(56) References Cited

U.S. PATENT DOCUMENTS

| | | | | |
|---|---|---|---|---|
| 5,042,883 | A * | 8/1991 | McCann | B60T 8/327 303/14 |
| 6,247,764 | B1 * | 6/2001 | Koelzer | B60T 8/323 303/118.1 |
| 7,020,551 | B2 * | 3/2006 | Goebels | B60R 16/0233 280/5.502 |

(Continued)

*Primary Examiner* — Bradley T King
(74) *Attorney, Agent, or Firm* — Brinks Gilson & Lione

(57) ABSTRACT

An electro-pneumatic tractor protection valve assembly (8) including a trailer supply input (84) for receiving a supply pressure, a trailer service output (87) for delivering a trailer supply pressure, a first supply input (81) for receiving a primary driver brake pressure, a second supply input (82) for receiving a secondary driver brake pressure, a dual brake valve (14) actuated by a brake pedal (10) and supplying the brake control pressures, a vent opening (86) for venting an internal conduit, a first electrically controlled pneumatic valve (92) to receive a first electric control signal for trailer assistance braking, and a trailer control output (85) for delivering a trailer brake control pressure. The valve assembly includes one single casing (8a) accommodating the first supply input (81), the second supply input (82), the trailer supply input (84), the trailer control output (85), the vent opening (86) and the trailer service output (87).

12 Claims, 13 Drawing Sheets

(56) References Cited

U.S. PATENT DOCUMENTS

| | | | | |
|---|---|---|---|---|
| 2008/0258542 A1* | 10/2008 | Soupal | ............... | B60T 7/20 |
| | | | | 303/7 |
| 2011/0175440 A1* | 7/2011 | Eidenschink | ......... | B60T 8/3605 |
| | | | | 303/119.1 |
| 2014/0358395 A1* | 12/2014 | Harrison | ............... | B60T 8/1708 |
| | | | | 701/78 |
| 2018/0126968 A1* | 5/2018 | Eckert | ................ | B60T 8/1708 |

* cited by examiner

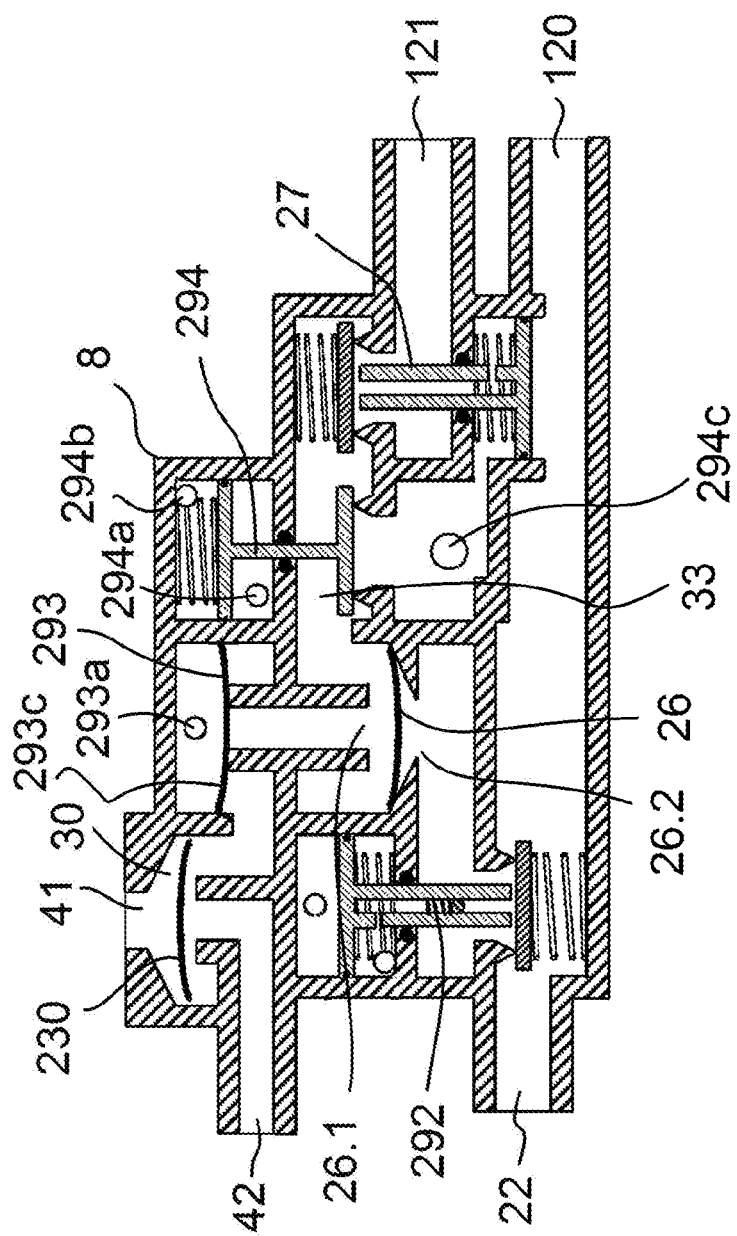

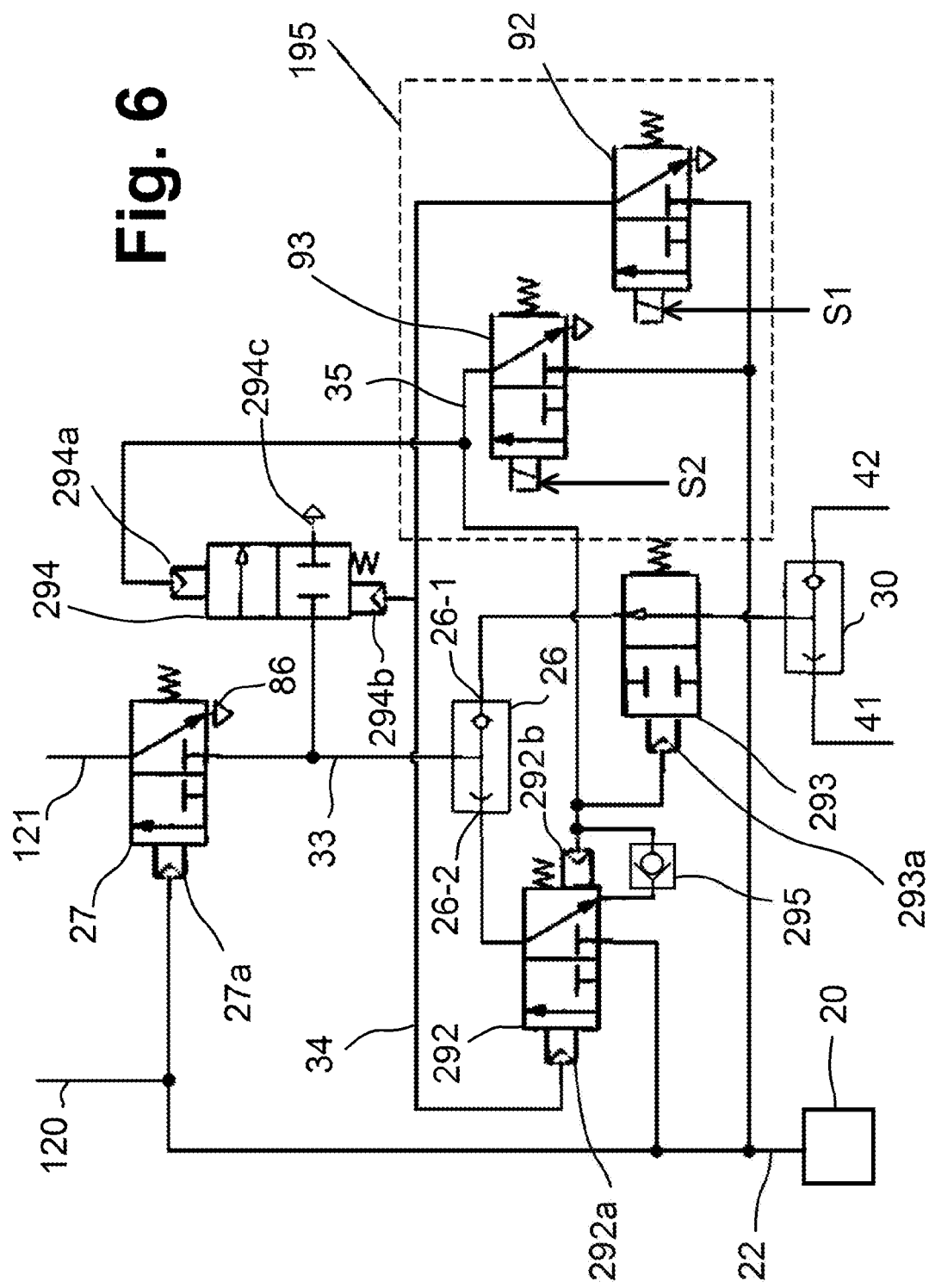

TRACTOR PROTECTION VALVE ASSEMBLY AND ELECTRO-PNEUMATIC BRAKE SYSTEM OF A TRACTOR VEHICLE

TECHNICAL FIELD

The present application relates to an electro-pneumatic tractor protection valve assembly to be used in a tractor vehicle, for supplying a trailing vehicle with a trailer supply pressure and with a trailer brake control pressure for enabling trailer brake processes of a trailer pneumatic brake system of the trailing vehicle.

BACKGROUND

In a vehicle combination of a tractor vehicle (towing vehicle) and a trailing vehicle (towed vehicle) pressurized air and brake signals are supplied from the tractor vehicle to the trailing vehicle. Pneumatic brake systems comprising analog pressure signals generally use a trailer supply line for providing the pressurized air to the trailer pneumatic brake circuit and a trailer control line or trailer service line for transmitting the pneumatic control signals to the trailer pneumatic brake circuit. A tractor protection valve assembly is provided in the tractor vehicle to be connected with the trailer supply line and the trailer control line, which are realized as pipes. Thus the tractor protection valve assembly serves as an interface between the tractor vehicle and the trailing vehicle.

FIG. 10 depicts an electro-pneumatic brake system 1002 of a tractor vehicle according to the prior art. A primary reservoir 11 containing a primary supply pressure p11 and a secondary reservoir 12 containing a second supply pressure p12 are provided independently to supply the electro-pneumatic brake system 1002 with pressurized air, wherein p11 and p12 should be equal. The driver actuates the brake pedal 10, thereby actuating a dual brake valve 14 which transmits a primary driver's brake pressure p41 supplied by the primary reservoir 11, and a secondary driver's brake pressure p42 supplied by the secondary reservoir 12. The driver's brake pressures p41, p42 are analog pneumatic pressures conducted to brake circuits 2a, 2b, and 2c, which are a front axle brake circuit 2a and a rear axle brake circuit 2b of the tractor vehicle 1 and a trailer brake circuit 2c of the trailing vehicle 3.

In this brake system 1002 of the prior art the secondary brake driver's pressure p42 is delivered to the front axle brake circuit 2a, together with the secondary supply pressure p12, in order to enable brake processes at the front axle by the secondary reservoir 12. The primary brake pressure p41 and the primary supply pressure p11 are conducted to the rear axle brake circuit 2b in order to enable rear axle brake processes. Further ABS-valves 200 and 300 are provided in the front axle brake circuit 2a and the rear axle brake circuit 2b for ABS control, the ABS-valves each comprising two 2/2-solenoid valves, respectively. An electronic control unit (ECU) 6 controls the ABS-valves 200 and 300.

A tractor protection valve assembly (TPVA) 1008 is provided in the tractor vehicle 1 for supplying the trailer brake circuit 2c with trailer supply pressure p120 via a trailer supply line (trailer supply pipe) 120 and for transmitting a driver's brake pressure p121 (analog control pressure) via a trailer control line (service line) 121, both lines 120 and 121 being connected to the trailing vehicle 3.

The trailing vehicle 3 may comprise a separate ABS system, which is not depicted in FIG. 10; in this case the ECU 6 and an ABS-ECU of the trailer vehicle may be connected via an electronic data connection, which is not depicted in FIG. 10. The tractor protection valve assembly 1008 is merely pneumatic.

An external driver assistance system 5, for example cruise control (CC), adaptive cruise control (ACC) or a pre-crash system for preventing a crash or lowering the damage in case of a crash, outputs external brake requests XBR to the ECU 6; the ECU 6 receives the XBR signals and controls the ABS-valves 200 and 300 for realizing the external assistance function. Further, the ECU 6 itself may initiate assistance brake processes as part of a stability system like ESC (electronic stability control) for enhancing the driving stability of the tractor vehicle 1 by selectively actuating vehicle brakes of the rear axle brake circuit 2b or the front axle brake circuit 2a. External assistance brake processes demanded or requested by a further control unit and internal assistance brake functions of the ECU 6 itself are hereinafter called "assistance brake processes"; they are not initiated by the driver's brake pedal 10 and therefore they cannot be realized on basis of the driver's brake pressures p41 and p42. Further, some brake systems 1 include a trailer assistance control valve (TCV) to be actuated by a TCV handle to initiate an anti-Jackknife brake process for selectively actuating the trailer brakes but not the tractor vehicle brakes to "stretch" or align the vehicle combination. Such a driver induced trailer brake process without actuating the driver's brake pedal is also to be evaluated as an "assistance brake process".

In order to execute assistance brake processes the ABS-valves 200 and 300 are charged with supply pressure p12 and p11, respectively, and controlled by the ECU 6 to deliver pressure values required for the assistance function.

Assistance brake processes can also be provided in the trailing vehicle. Therefore a trailer assistance control valve 250, which is configured in the same manner as the ABS valves 200 and 300, is switched between the front axle brake circuit 2a and the tractor protection valve 1008. Thus the ECU 6 outputs electric control signals to the trailer assistance control valve 250 in order to supply an analog pressure p250 as pneumatic control signal to the tractor protection valve assembly 1008, which in turn delivers the brake pressure p121 via the trailer control line 121 to start trailer brake processes. Thus the trailer assistance control valve 250 can be controlled in the same way as the ABS valves 200 and 300, in order to start assistance brake processes independently of the actuation of the brake pedal 10.

In general, it is better to connect the trailer assistance control valve 250 to the front axle brake circuit 2a rather than the rear axle brake circuit 2b, since additional control functions like a traction control systems for preventing a traction slip are provided at the driven rear axle; therefore the trailer assistance control valve 250 is separated from the rear axle brake circuit 2b.

However, a piping extending from the front axle brake circuit 2a to the tractor protection valve (TPV) 1008 located at the backside of the tractor vehicle 1 is relatively long and therefore expensive; further, the pneumatic signals are delayed in such a long piping, and increasing and releasing the pressure in long pipings results in a high energy consumption.

An object of the invention is to provide a tractor protection valve assembly which enables assistance functions at low costs and low effort.

This object is realized by the tractor protection valve assembly according to claim 1. Further an electro-pneumatic brake system for a tractor vehicle comprising such a tractor protection valve is provided.

The tractor protection valve assembly according to the invention therefore comprises a single casing, in which at least one solenoid valve is provided. Further the supply inputs and outputs for receiving supply pressure as well as driver's control pressure and for supplying the trailing vehicle with supply pressure and control pressure are provided in the casing.

Thus an air piping between the front axle brake circuit and the tractor protection valve assembly is not necessary. Electric control signals supplied by the ECU are used for switching the at least one solenoid valve inside the tractor protection valve assembly, thereby using the pressure supply input for realizing assistance brake processes to be supplied to the trailer control pipe.

The invention provides several advantages:

The piping inside the tractor vehicle can be reduced. Thus the total equipment costs can be reduced, control functions are less delayed and energy consumption for pressure increase and release in the long pipings can be reduced.

The invention is based on the idea that a tractor protection valve assembly can be realized inside one casing by incorporating at least one, in particular one or two electrically controlled solenoid valves together with further pneumatic valve equipment like one or two two-way valves and a tractor protection valve (TPV), which tractor protection valve can in particular be realized as a pneumatically actuated 3/2 way valve.

The tractor protection valve is in particular pneumatically controlled by a trailer supply valve (TSV), which can be actuated by a TSV handle provided in the dashboard region of the tractor vehicle. The driver therefore actuates the TSV handle thereby pressurizing the trailer supply pipe in order to release the spring brakes of the trailing vehicle, thereby switching the TSV valve into its open status.

According to one embodiment two electrically controlled 2/2-solenoid valves are provided in the casing of the tractor protection valve assembly (TPVA), thereby enabling phases of pressure increase, pressure holding and pressure release (venting) in the trailer control line to be connected to the tractor protection valve assembly and plugged into an input of the trailer vehicle.

According to an alternative embodiment one electrically controlled 3/2 way solenoid valves is provided in the casing of the tractor protection valve assembly, thereby enabling phases of pressure increase and pressure release (venting) of the trailer control line extending to the trailer vehicle. Thus the phase "pressure holding" cannot be realized; however, the ECU may output control signals in order to alternatingly increase and release the control pressure output, leading to a pressure-time profile like a "sawtooth". Such a sawtooth profile may increase the air consumption; however, it may reveal advantages, since it enables an ABS-like braking behavior of the trailer brakes.

BRIEF DESCRIPTION OF THE DRAWINGS

The invention is explained in more detail below be means of preferred embodiments shown the drawings, wherein

FIG. 5d is a sectional view of a hardware realization of a tractor protection valve assembly during a pressure hold;

FIG. 6 is a further electro-pneumatic scheme according to a further embodiment;

The drawings are provided herewith for illustrative purposes only and are not intended to limit the scope of the present invention.

DETAILED DESCRIPTION OF THE DRAWINGS

Figure 9:
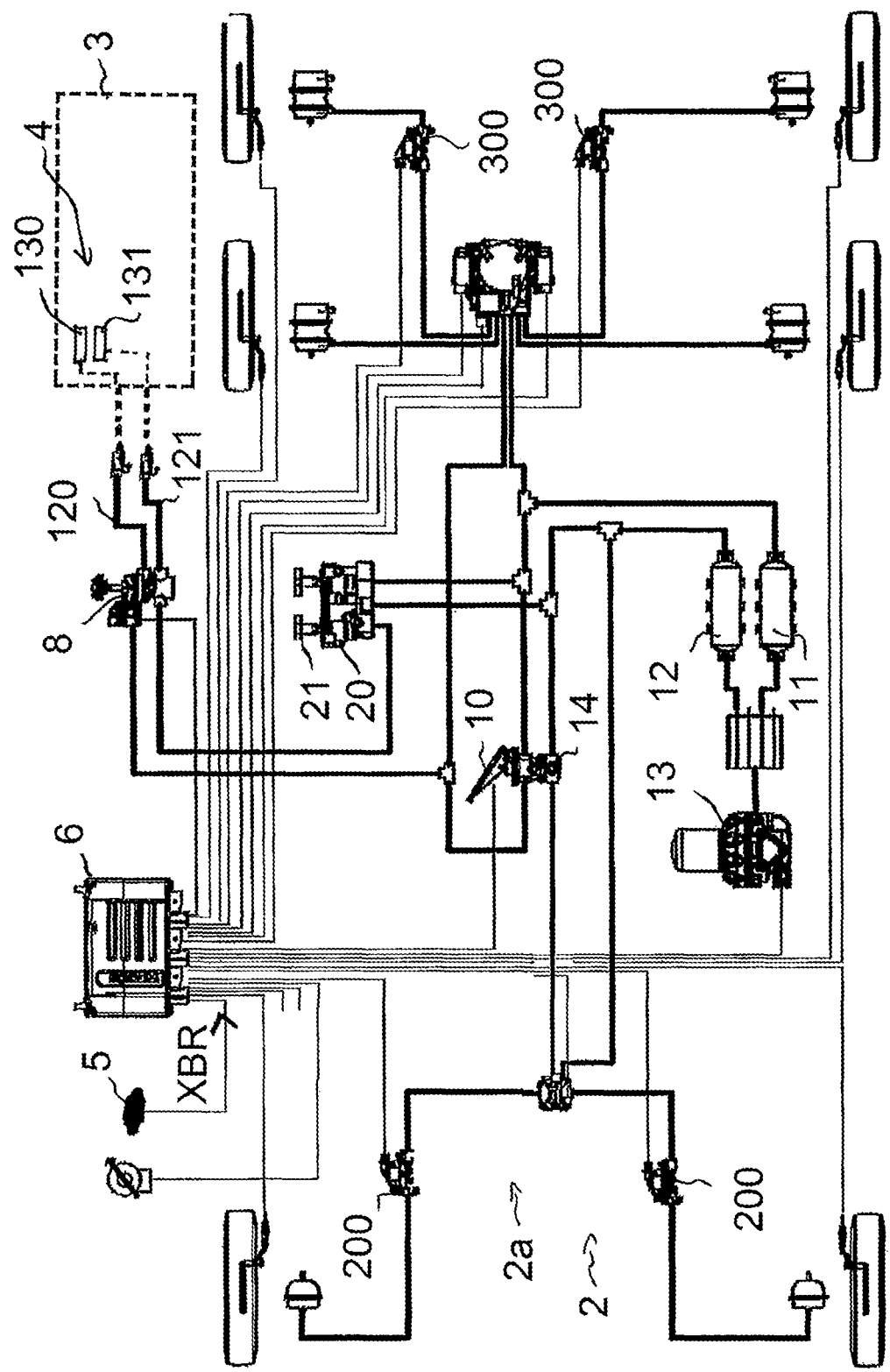
FIG. 9 is an electro-pneumatic scheme of the tractor vehicle according to the invention.
Figure 10:
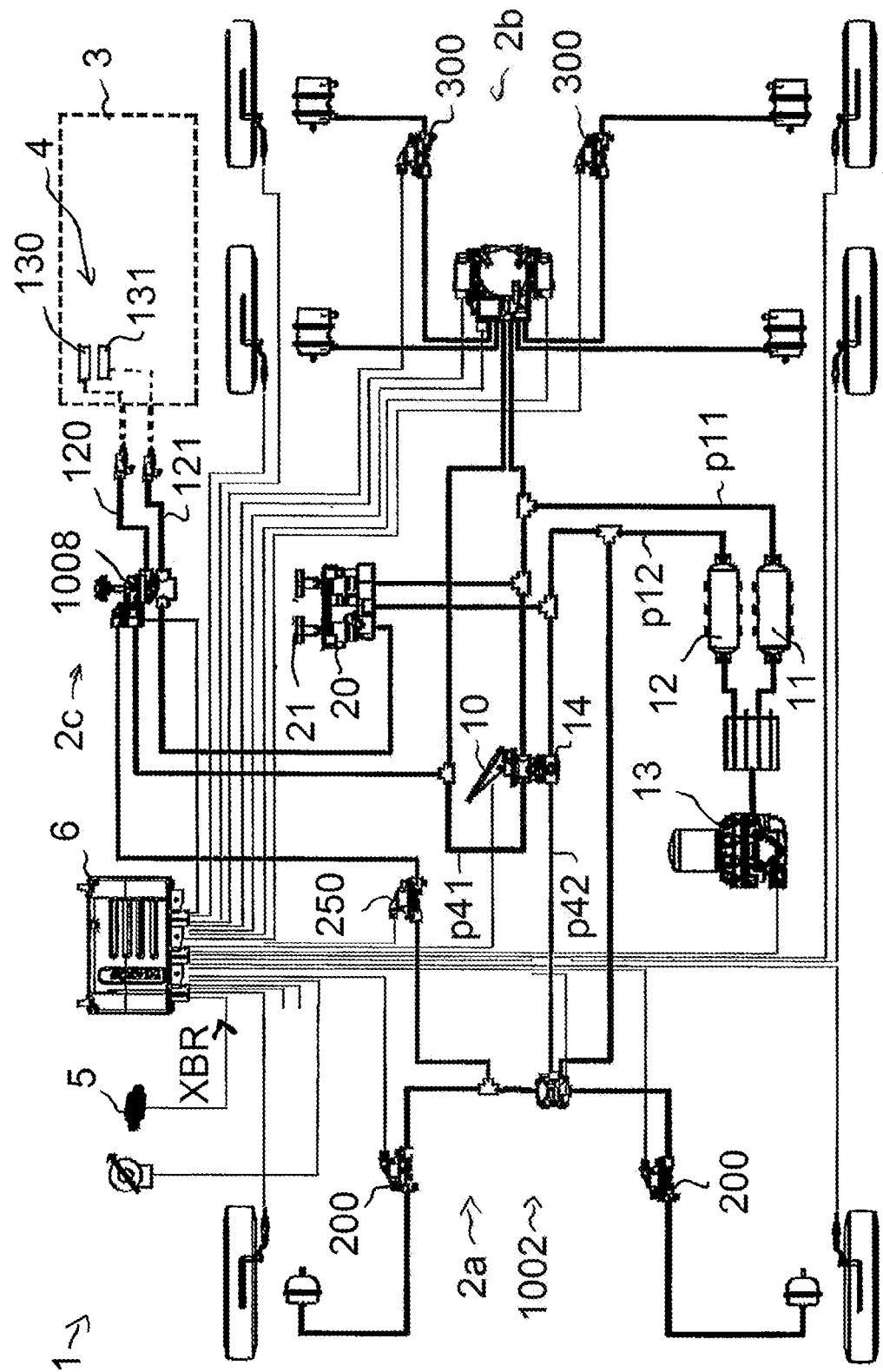
FIG. 10 is an electro-pneumatic scheme of the tractor vehicle according to the prior art.

A tractor vehicle 1 comprising an electro-pneumatic brake system 2 tows a trailing vehicle 3 comprising a pneumatic or electro-pneumatic brake system 4 is shown in FIG. 9.

The electro-pneumatic brake system 2 of the tractor vehicle 1 comprises several brake circuits, for example according to FIG. 9 a front axle brake circuit 2a, a rear axle brake circuit 2b and a trailer brake circuit 2c for supplying the trailer pneumatic brake system 4 with compressed air. The brake circuits 2a, 2b, and 2c are controlled by an electronic control unit (ECU) 6 of the tractor vehicle 1 and supplied with pressurized air by a primary reservoir 11 and a secondary reservoir 12 fed by a compressor 13.

The tractor vehicle 1 is equipped with at least one driver assistance system 5, for example a cruise control (CC), adaptive cruise control (ACC), an ESC (electronic stability control) or a pre-crash system for preventing a crash or refusing damages of a crash. The driver assistance system 5 outputs external brake request signals XBR to the electronic control unit (ECU) 6 of the electro-pneumatic brake system 2, in order to start assistance brake procedures.

Figure 1:
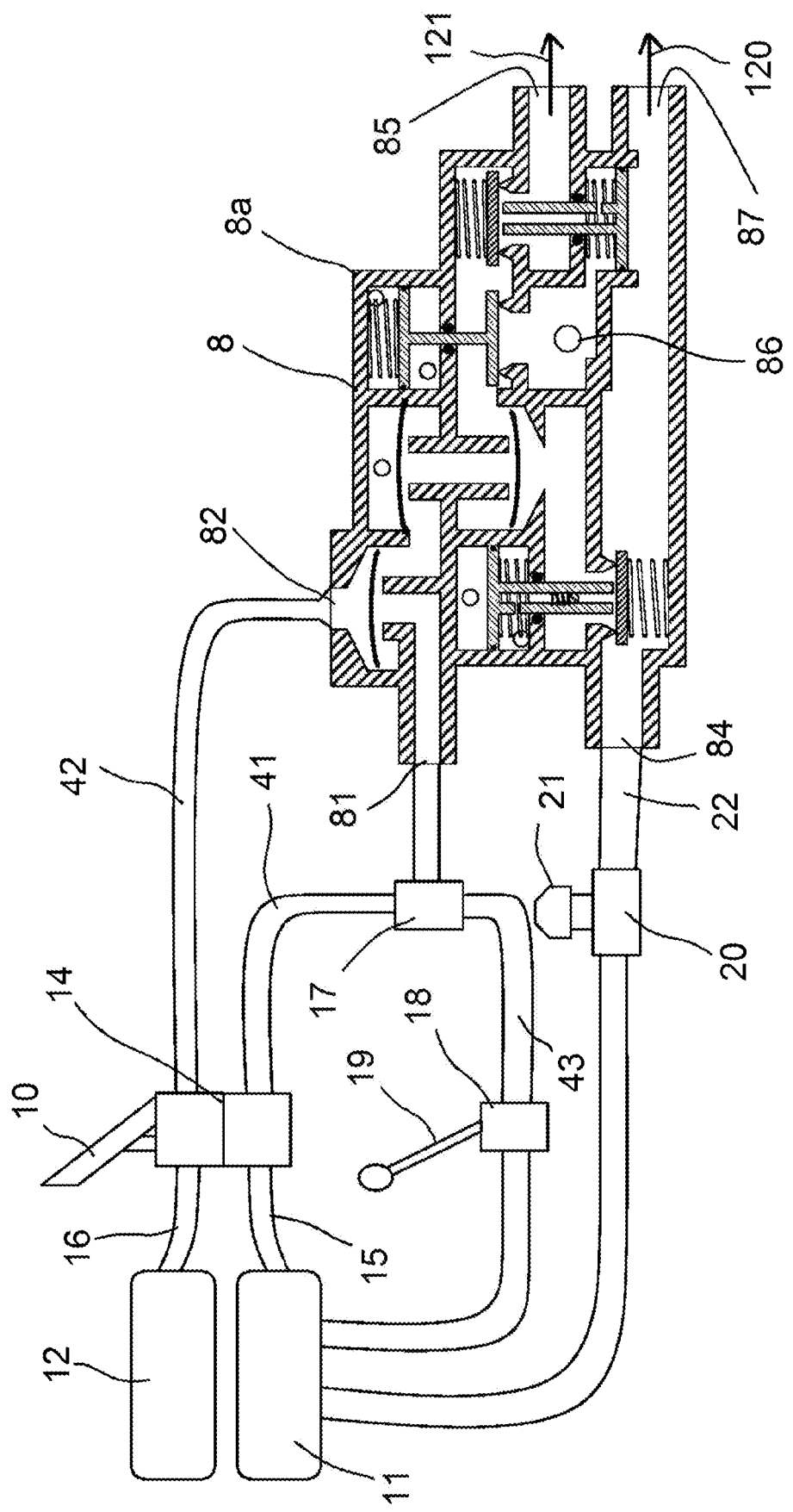
FIG. 1 is an electro-pneumatic scheme of a tractor protection valve (TPV) in sectional view.

FIG. 1 depicts the hardware realization of the most relevant parts of the trailer control brake system 2c located in the tractor vehicle 1. A tractor protection valve assembly (TPVA) 8 is provided and manufactured in a single casing 8a, for example as a block, in particular as a die cast part of aluminum or steel with bores for receiving valves and providing conduits between its valves and ports.

A primary reservoir 11 and secondary reservoir 12 are provided in the electro-pneumatic brake system 2 for supplying the brake circuits 2a, 2b and 2c. A driver's brake pedal 10 controls a dual brake valve 14 which is interconnected between the primary reservoir 11 and secondary reservoir 12 serving as pressure supplies or pressure inputs, and the tractor protection valve assembly 8. Thus the device of FIG. 1 comprises a first supply pipe 15 connected between the primary reservoir 11 and the dual brake valve 14, a second supplied pipe 16 between the secondary reservoir 12 and the dual brake valve 14, a first control pipe 41 connecting the dual brake valve 14 via a select high valve 17 with a first supply input 81 of the tractor protection valve assembly 8, and a second control pipe 42 connecting a second supply input 82 of the tractor protection valve assembly 8 with the dual brake valve 14. Further a trailer assistance control valve (TCV) 18 and a trailer supply valve (TSV) 20 are connected to the primary reservoir 11. The trailer assistance control valve 18 is actuated by a trailer assistance control valve handle 19 to be handled by the driver, and the trailer supply valve 20 is provided with a trailer supply valve handle 21 to be actuated by the driver; both handles 19 and 21 can be placed in the dashboard of the tractor vehicle 1. The output of the trailer assistance control valve 18 is connected via a TCV line 43 and the select high valve 17 with the trailer control input 82 of the tractor protection valve assembly 8, and the output of the trailer supply valve 20 is connected via a TSV line 22 with a trailer supply input 84 of the tractor protection valve assembly 8.

The tractor protection valve assembly (TPVA) 8 further comprises a trailer service output 87 to be connected with the trailing vehicle 3 via a trailer supply line 120, and a trailer control output 85 to be connected with the trailing vehicle 3 via a trailer control line 121 (trailer emergency line). The TSV line 22 is directly connected to the trailer supply line 120 via bores in the casing 8a of the tractor protection valve assembly 8. Both lines 120 and 121 extend between the vehicles 1 and 3 as pipes or hoses and can be marked by colors, e.g. a red color for the trailer supply line 120 and a blue or yellow color for the trailer control line 121.

2/2-solenoid valves 92 and 93 are provided in the tractor protection valve assembly 8; the solenoid valves 92 and 93 inside the casing 8a are not depicted for reasons of clarity.

The function of the tractor protection valve assembly 8 is now described in detail on basis of the electro-pneumatic schemes of FIGS. 2 to 8.

Figure 2:
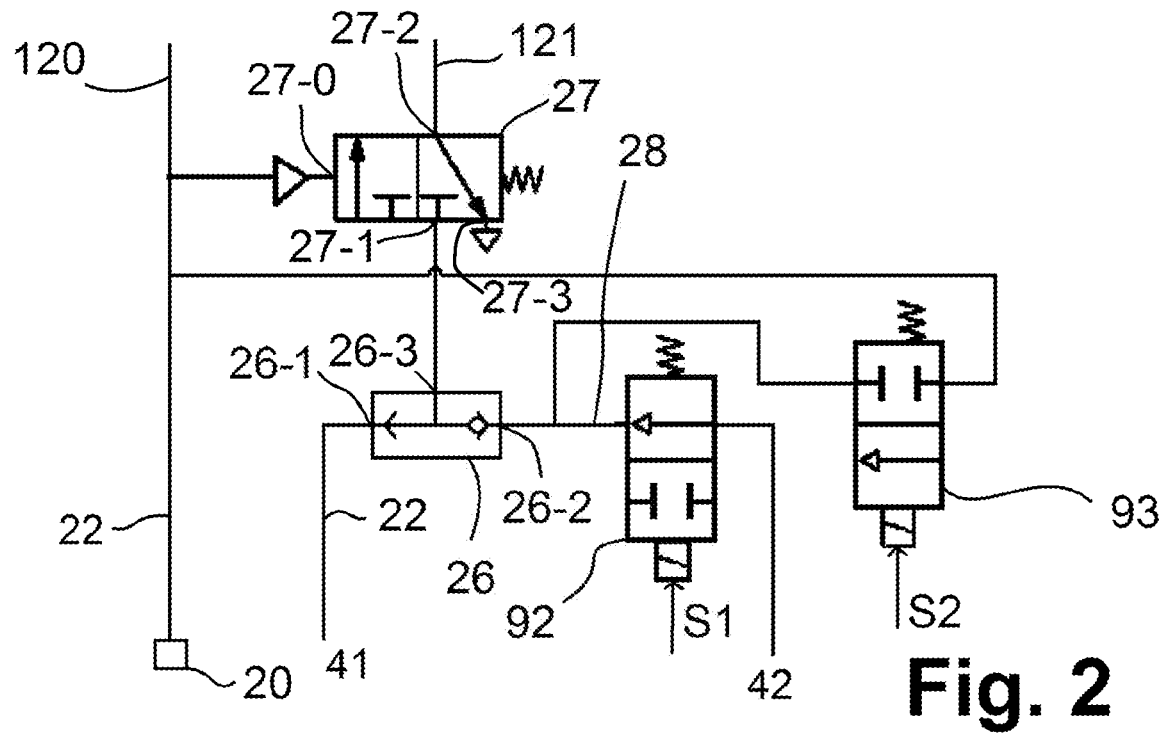
FIG. 2 is an electro-pneumatic scheme of a tractor protection valve according to one embodiment of the invention.

According to the embodiment of FIG. 2, the first control pipe 41 and the second control pipe 42 are pressurized in case of a brake actuation by the driver; the driver's brake pressures p41 and p42 delivered by the dual brake valve 14 are analog pressure values. The first solenoid valve 92 is in basic position, i.e. open. A first two-way valve (alternating check valve, shuttle valve) 26 is connected to both control pipes 41 and 42 in order to pass the higher brake pressure through to its output 26-3, which leads to the input 27-1 of the 3/2 tractor protection valve 27, which is pneumatically actuated at its control input 27-0 by the trailer supply valve 20.

The trailing vehicle 3 comprises spring brakes 130, which are closed in their non-actuated basic position and must be released by the pressurized trailer supply line 120. If the driver actuates the TSV handle 21, the TSV line 22 is pressurized, thereby pressurizing the trailer supply line 120 and releasing the trailer spring brakes 130 in the trailing vehicle 3. Further the 3/2 tractor protection valve 27 is actuated into its open position connecting its ports 27-1 and 27-2. Thus trailer braking processes are afterwards initiated via the trailer control line 121, if the first control pipe 41 or the second control pipe 42 are pressured or if S1=1 thereby actuating solenoid valve 92 and pressurizing the second control pipe 42 as described hereinafter.

If an external brake request XBR is sent to the ECU 6, the ECU 6 controls the solenoid valves 92 and 93 by electric signals S1 and S2 in order to enable an assistance trailer brake procedure. The second control signal S2 switches the second solenoid valve 93 from its closed basic position into its open actuated position, thereby transferring the supply pressure p22 of the TSV line 22 to the second input of the two-way valve 26, which serves to pressurize the trailer control line 121 by the trailer supply pressure p120 independently of the pressure in the control pipes 41 and 42; the two-way valve 26 always passes the higher pressure of the two pressures acting upon its inputs 26-1 and 26-2 through to its output 26-3. The second solenoid valve 93 is used to vent the air in the connecting conduit 28 between the valves 92, 93, and 26.

Figure 3:
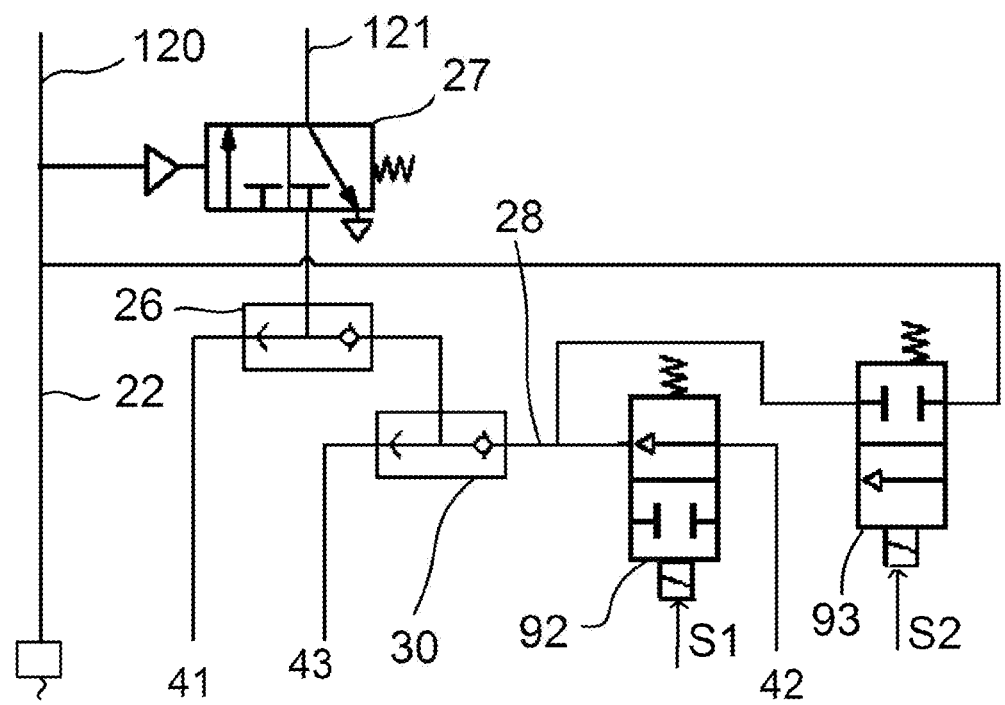
FIG. 3 is a further electro-pneumatic scheme according to a further embodiment.

The tractor protection valve assembly 8 according to the embodiment of FIG. 3 further comprises a second two-way valve 30, which is interconnected between the first 2/2-solenoid valve 92 and the first two-way valve 26. The second two-way valve 30 is provided for receiving the TCV line 43 extending from the trailer assistance control valve 18 as second input, together with the second control pipe 42 passing through the open first solenoid valve 92 as second input. Thus the driver has the option to actuate the trailer assistance control valve 18 by the TCV handle 19 thereby pressurizing the TCV line 43. If the TCV line 43 is not pressurized, the output of the second two-way valve 30 may be pressurized by the first control pipe 42. If both lines 42 and 43 are pressurized, the higher pressure passes to the first two-way valve 26, which further receives the first control pipe 41, as already describe above with respect to FIG. 2.

Thus in FIGS. 2 and 3 the two-way valves 26 and 30 are provided for enabling each connected supply line 41 and 42, and 43 to pressurize the first port 27-1 of the 3/2 tractor protection valve 27 by a maximum selection. According to the embodiment of FIG. 3 the driver can selectively actuate the trailer brakes, without braking the tractor vehicle, in order to stabilize the vehicle combination; such a stabilizing brake process is known as anti jackknife braking.

Figure 4:
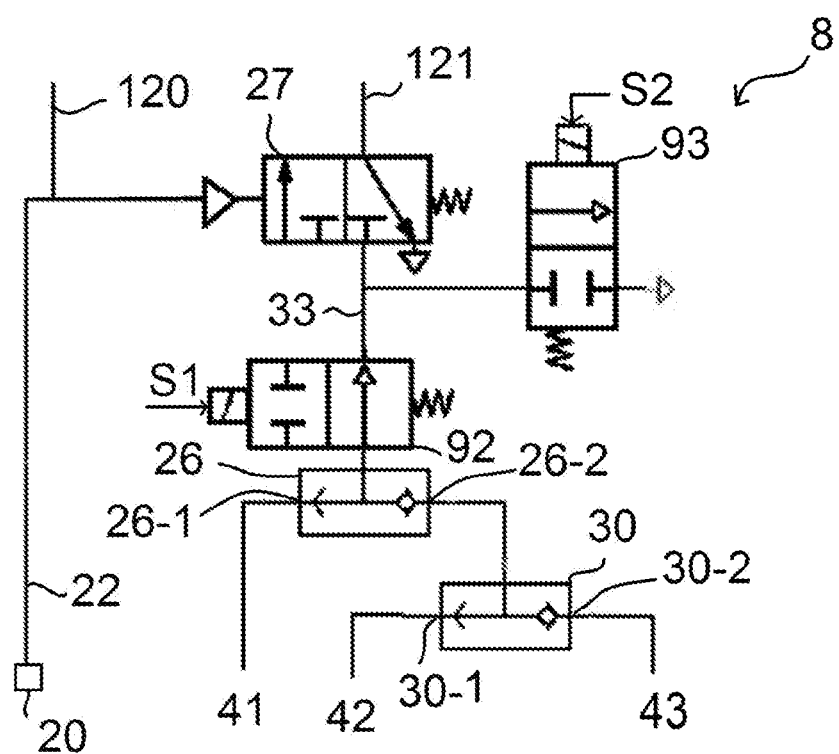
FIG. 4 is a further electro-pneumatic scheme according to a further embodiment.

The embodiment of FIG. 4 discloses a tractor protection valve assembly 8, in which the first solenoid valve 92 is interconnected between the 3/2 tractor protection valve (TPV) 27 and the first two-way valve 26. The second solenoid valve 93 controlled by the second control signal S2 is connected to the conduit 33 between the valves 92 and 27 and is used for reducing the pressure in the conduit 33.

The first solenoid valve 92 is open in basic state thereby serving as an inlet valve comparable to an ABS inlet valve; the second solenoid valve 93 is closed in its basic state thereby serving as an outlet valve comparable to an ABS outlet valve. Thus, if tractor protection valve 27 is open, the solenoid valves 92 and 93 are comparable to ABS-valves, enabling phases of pressure increase (S1=0, S2=0), pressure constant (S1=1, S2=0) and pressure release (S1=1, S2=1) of the trailer control line 121. The first solenoid is used for blocking the pressure induced by the driver if the automatic pressure control is active. This ensures that the pressure in the trailer control line 121 can be lower than in the lines 41 and 42.

FIG. 6 depicts a further embodiment of the tractor protection valve assembly 8, wherein the solenoid valves 92 and 93 realize an electrical pre-control unit 195 pneumatically connected to the pneumatic valves; the first solenoid valve 92 is connected to a second conduit 34 controlling the pneumatic 3/2 way valve 292 and the pneumatic 2/2-(check) valve 294; the first solenoid valve 92 switches by S1=1, thereby venting the second conduit 34 (i.e. increasing pressure) and switching the 3/2 way valve 292 from its discharging position into its open position to pass pressurized air from the TSV line 22 to the two-way check valve 26 and to the TPV 27. The second solenoid valve 93 controlled by S2 serves to pressurize a third conduit 35 thereby switching the 3/2 way valve 292 back into its discharging position and switching the 2/2-check valve (blocking valve) 293 into its blocking position and further the check valve 294 into its open position to discharge the first conduit 33.

Figure 7:
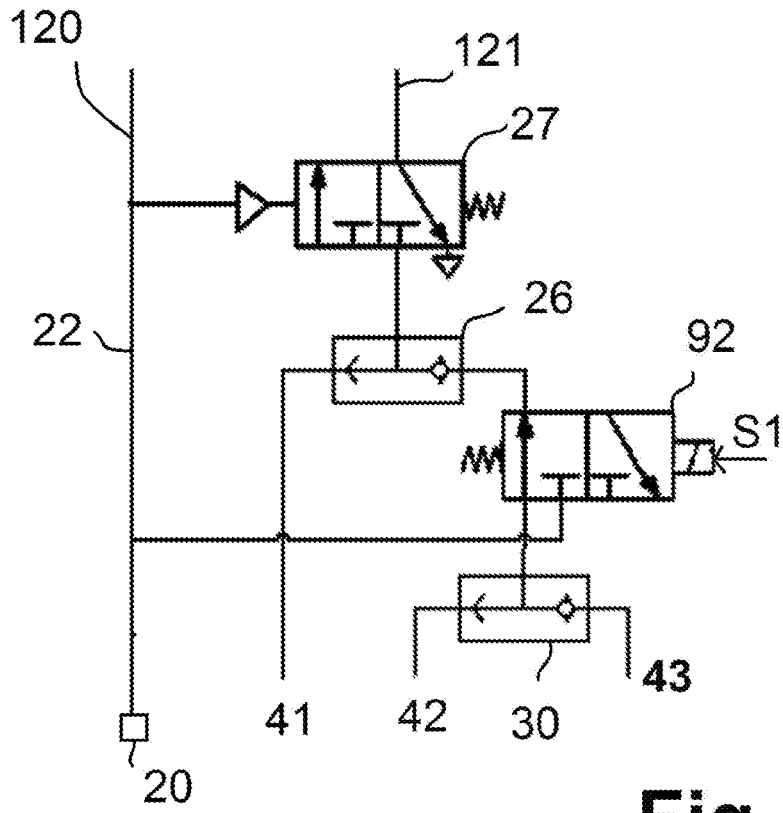
FIG. 7 is a further electro-pneumatic scheme according to a further embodiment.

The TPVA 8 of FIG. 7 comprises a TCV line 43 for enabling an anti-Jackknife braking, wherein the TCV line 43 and the second control pipe 42 are transferred to a first 3/2 way solenoid valve 92 via a second two-way valve 30. The output of the first 3/2 way solenoid valve 92 is then input to the first two-way valve 26, together with the first control pipe 41; the output of the first two-way valve 26 is then delivered to the tractor protection valve 27, which in turn is opened by the TSV line 22.

Figure 8:
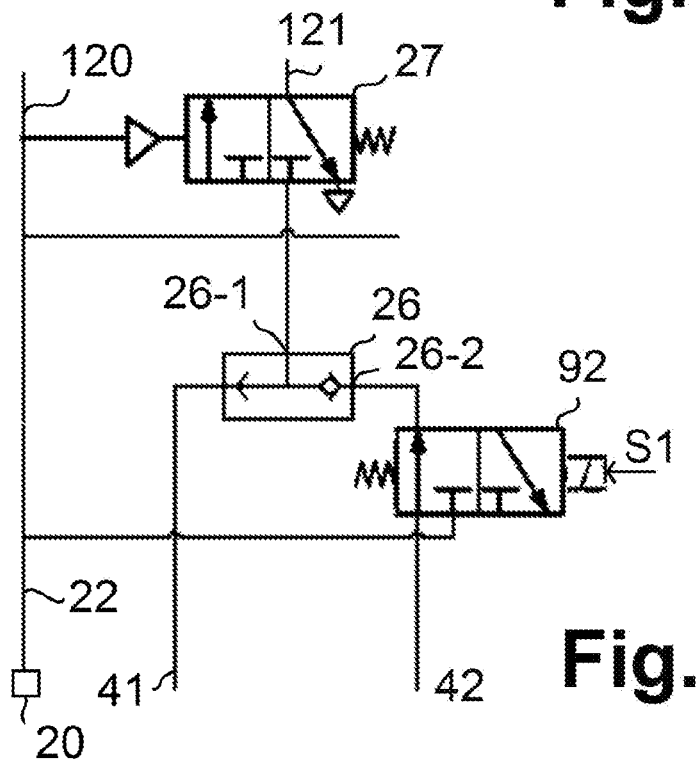
FIG. 8 is a further electro-pneumatic scheme according to a further embodiment.

FIG. 8 corresponds to the embodiment of FIG. 7, but without a TCV line 43 and therefore without the second two-way valve 30.

The embodiments of FIGS. 7 and 8 realize assistance brake processes of the trailer vehicle 3 by an electrically actuated 3/2 way solenoid valve 92 rather than two 2/2 solenoid valves. Thus only one electric control signal S1 is used. However, the trailer brake control pressure p121 passed through the 3/2 way solenoid valve 92 can be increased in its actuated position and lowered in its basic venting position; a third state or position of pressure holding is not provided.

Figure 11:
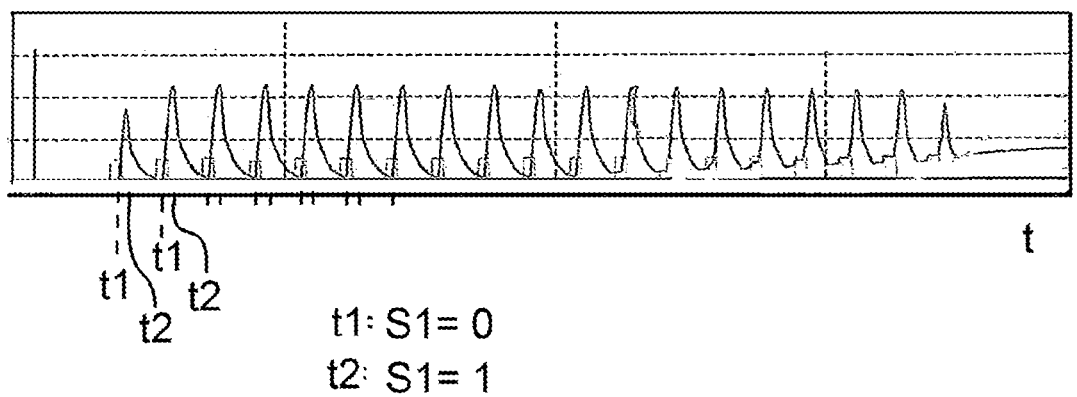
FIG. 11 discloses a diagram of the trailer brake pressure in the trailer control line as a function of time according to the embodiments of FIGS. 7 and 8.

FIG. 11 discloses a diagram of the trailer brake control pressure p121 in the trailer control line 121 delivered by the 3/2 way solenoid valve 92 as a function of time t. The 3/2 way solenoid valve 92 is open at S1=1 thereby increasing the trailer brake control pressure p121 up to a maximum value and vents the trailer control line 121 at S1=0 thereby lowering the trailer brake control pressure p121 down to the trailer brake control pressure p121=0. Thus a sawtooth function is realized instead of a constant analog value of the trailer brake control pressure p121 midway between these extreme values. Such a sawtooth profile of the delivered trailer brake control pressure p121 increases the air consumption with respect to a constant mid pressure; however, it can be advantageous for trailer vehicles without an ABS function, since the lock status, if p121=0 bar, can serve to release the trailer service brakes 131, similar to a real ABS brake system. The ECU 6 therefore can calculate the times t1 and t2 in order to reach an appropriate relation of braking phases (S1=1) or "pressure increase" and release phases (S1=0) or "pressure release".

Further, only one solenoid is needed in case of the embodiments of FIGS. 7 and 8.

The casing 8a is preferably a die-cast part, in particular made of aluminum or steel, comprising bores as conduits and bores for inserting the internal valves, in particular valves 26, 27, 30, 92, 93, 94, and 292.

Figure 5A:
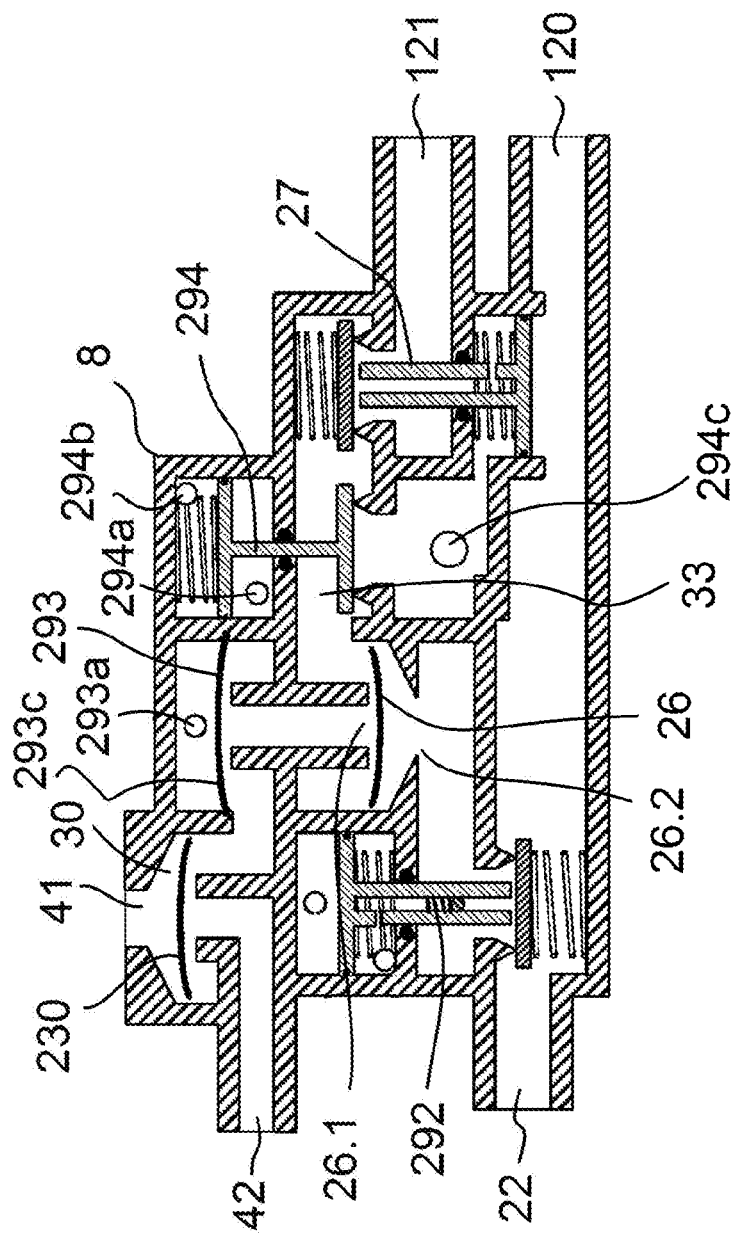
FIG. 5a is a sectional view of a hardware realization of a tractor protection valve assembly in a basic position without trailer.

FIG. 5 shows an embodiment of a hardware realization of an electro-pneumatic TPVA 8 according to the embodiment of FIG. 6; thus FIG. 5a) to in its most relevant positions. The TPVA 8 is preferably realized in a single casing 8a, made e.g. as a die cast part. The trailer supply line 120 and trailer control line (trailer emergency line) 121 are realized as conduits, as well as the second control pipe (tractor control secondary) 42 and the first control pipe (tractor control primary) 41. The second check valve (second shuttle valve) 30 is realized by a moveable and/or flexible diaphragm (partition) 230. Thus the higher pressure of the control pipes 42 and 41 pressurized by a driver's brake actuation passes the second two-way check valve 30 to the relay valve 293; i.e., the diaphragm 230 closes its second input of the second control pipe 42 and opens its first input 30a of the first control pipe 41, and vice versa.

The pneumatically actuated check valve 293 is realized by a diaphragm 293c, which is open in its basic position of FIG. 5a, and closed by control pressure supplied to its control port 293a. The second two-way check valve 26 is realized in the same manner as the two way check valve 30 by a diaphragm. The pneumatically controlled check valve 294 comprises two control inputs 294a and 294b and is biased by a spring. The TPV 27 is controlled by the trailer supply line 22 (which is connected to the trailer supply pipe 120).

FIG. 5a depicts the basic position of the TPVA 8, in which no trailer is connected. Pressurized air supplied in a driver's brake action via the second control pipe 42 and/or the first control pipe 41 may pass the two-way check valve 26 and the open check valve 293 and the second two-way check valve 30, but it is blocked by the tractor protection valve 27, which is in its blocking basic position, since there is no pressure on the TSV line 22.

Figure 5B:
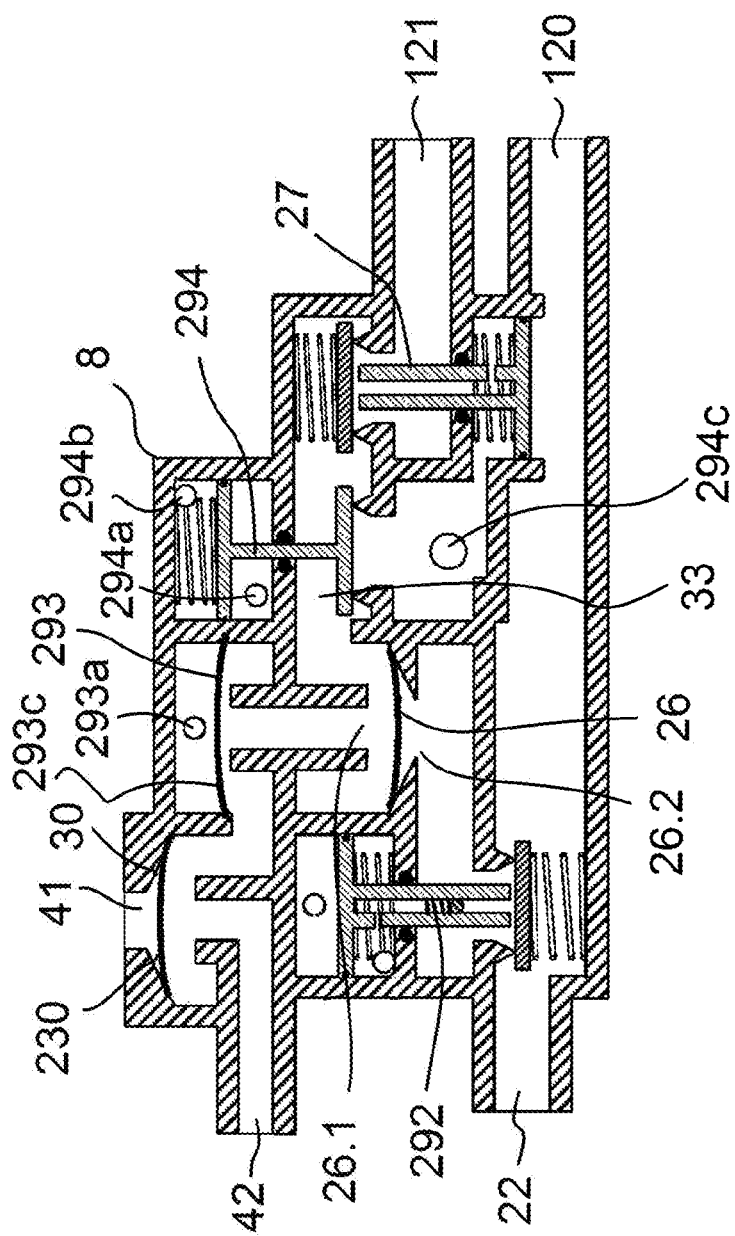
FIG. 5b is a sectional view of a hardware realization of a tractor protection valve assembly during driver induced braking with a connected trailer.

FIG. 5b depicts the driver's braking position with connected trailer. Thus the trailer supply line 22 and trailer supply pipe 120 are pressurized, thereby switching the tractor protection valve 27 in its actuated, open position, and thereby pressurizing the trailer control line (trailer emergency line) 121. In FIG. 5b the pressure in the second control pipe 42 is higher than in the first control pipe 41 thereby opening the two-way check valve 30 in this way.

Figure 5C:
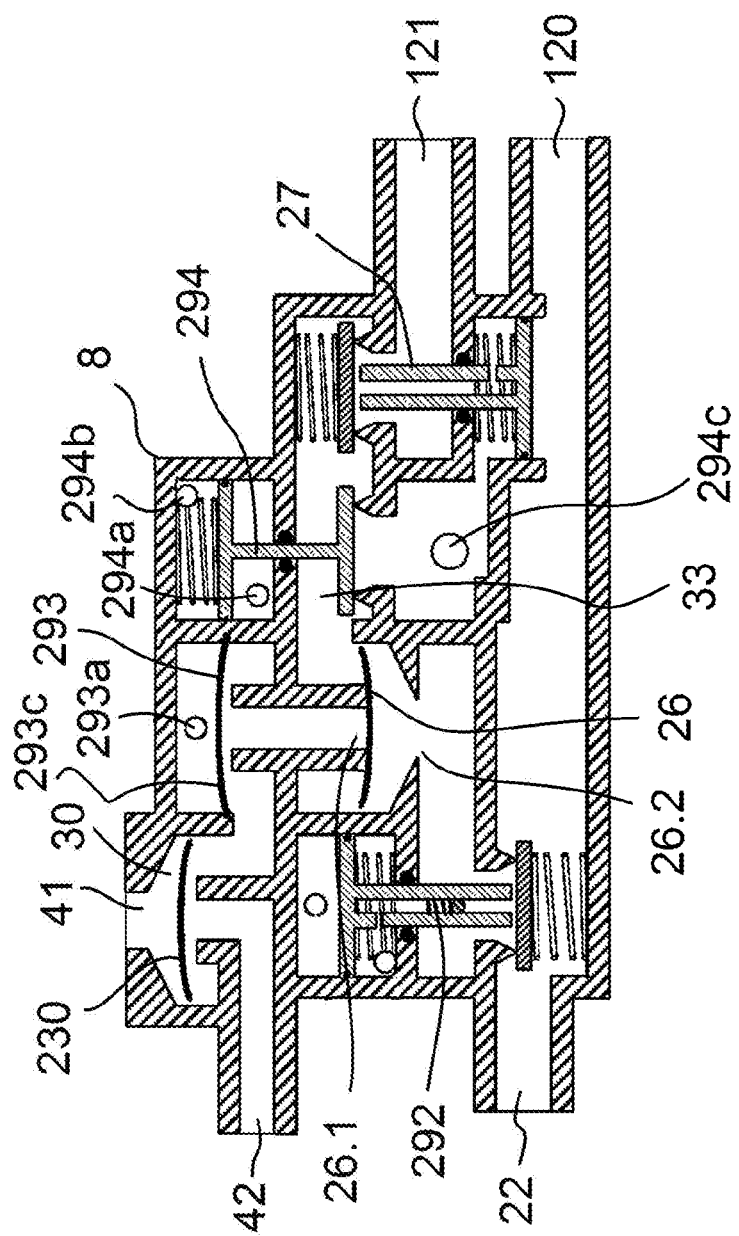
FIG. 5c is a sectional view of a hardware realization of a tractor protection valve assembly during a pressure increase (active assistance function)

In FIG. 5c the external pressure increase is shown, i.e. the brake assistance function for the connected trailer, without driver's brake action. The input of the pneumatic valves 292 and 29b are pressurized, thereby closing 2/2-check valve 294 and opening 3/2 way valve 292. Thus pressurized air from the trailer supply line 22 can pass through the valves 292, 26, 294, and 27 to the trailer control line 121, as visualized by dotted lines.

FIG. 5d shows the position of pressure holding (pressure blocking), in which S1=1 and S2=1; thus valves 292 and 294 are in their basic positions, and the diaphragm 293 holds the pressure. This function is explained on the basis of FIG. 6 due to the unidirectional check valve 295 provided between the third conduit 35 shown in FIG. 6 and the second control input 292b of the 3/2 way valve 292 no pressurized air flows from the second control input 292b to the second input port 26-2.

Figure 5E:
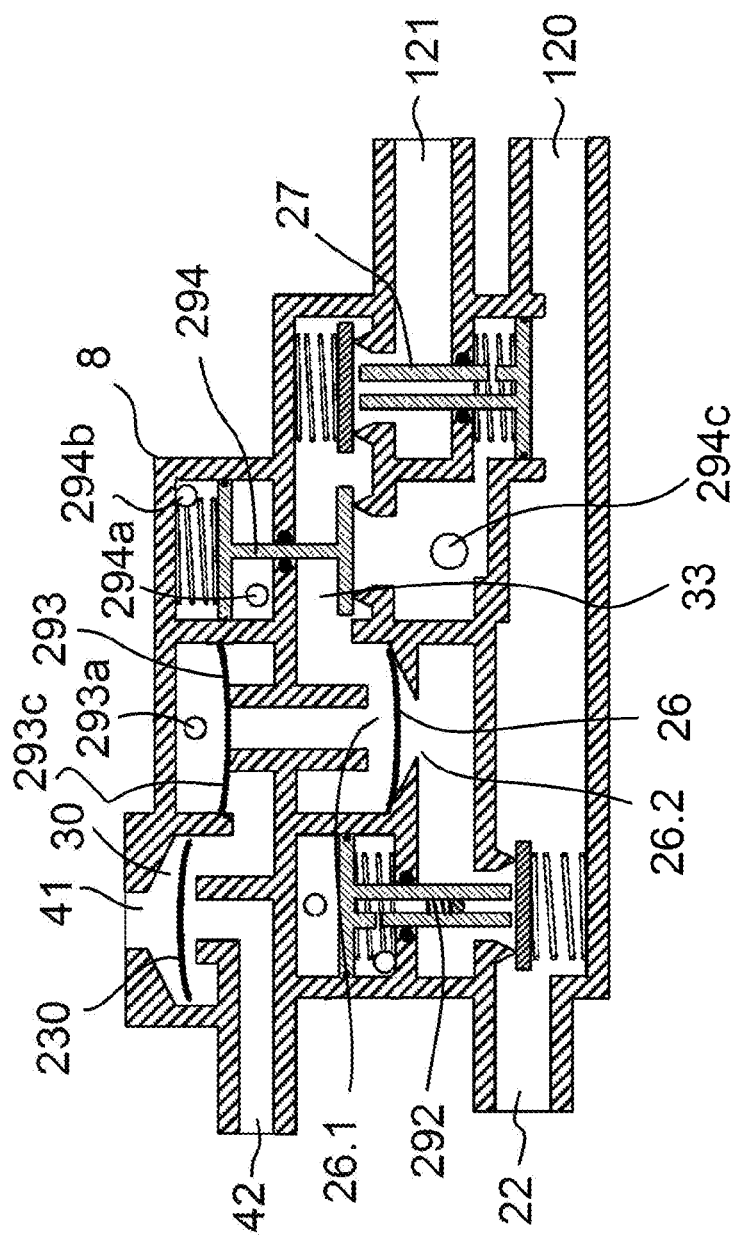
FIG. 5e is a sectional view of a hardware realization of a tractor protection valve assembly during a pressure decrease.

FIG. 5e depicts the position of pressure decrease, in which S1=0 and S2=1. The second solenoid valve 93 is actuated, thereby pressurizing the third conduit 35 and thereby the second control input 292b of the 3/2 way valve 292, which is then switched. Further the pressure in conduit 35 actuates the control input 293a thereby closing the 2/2 check valve 293 in order to avoid an additional driver's brake action, and actuates the 2/2 check valve 294 in order to exhaust the first conduit 33 via the exhaust 294c.

While the above description constitutes the preferred embodiments of the present invention, it will be appreciated that the invention is susceptible to modification, variation and change without departing from the proper scope and fair meaning of the accompanying claims.

LIST OF REFERENCE CHARACTERS

| | |
|---|---|
| 1 | tractor vehicle |
| 2 | electro-pneumatic brake system |
| 2a | front axle brake circuit |
| 2b | rear axle brake circuit |
| 2c | trailer brake circuit |

LIST OF REFERENCE CHARACTERS

| | |
|---|---|
| 3 | trailing vehicle |
| 4 | trailer pneumatic or electro-pneumatic brake system |
| 5 | driver assistance system e.g. cruise control (CC), automatic cruise control (ACC), ESC (electronic stability control) or pre-crash system for preventing a crash or refusing damages of a crash, |
| 6 | electronic control unit (ECU) of the electro pneumatic brake system 2 |
| 8 | tractor protection valve assembly (TPVA) |
| 8a | casing of TPVA 8 |
| 10 | driver's brake pedal |
| 11 | primary reservoir |
| 12 | secondary reservoir |
| 14 | dual brake valve |
| 15 | first supply pipe |
| 16 | second supply pipe |
| 17 | select high valve |
| 18 | trailer assistance control valve (TCV) |
| 19 | TCV handle |
| 20 | trailer supply valve (TSV) |
| 21 | TSV handle |
| 22 | TSV line |
| 26 | first shuttle valve (alternating check valve, two-way valve) |
| 26-1 | first input port |
| 26-2 | second input port |
| 26-3 | output port |
| 27 | tractor protection valve (TPV) |
| 27-1 | first port, input port |
| 27-2 | second port, output port |
| 27-3 | venting port |
| 28 | connecting conduit |
| 30 | second check valve |
| 33 | first conduit |
| 34 | second conduit |
| 35 | third conduit |
| 41 | first control pipe |
| 42 | second control pipe |
| 43 | TCV line |
| 81 | first supply input |
| 82 | second supply input |
| 84 | trailer supply input |
| 85 | trailer control output |
| 86 | vent |
| 87 | trailer service output |
| 88 | stoplight output |
| 92 | first solenoid valve, 3/2 way solenoid valve |
| 93 | second solenoid valve |
| 94 | third solenoid valve |
| 95 | pneumatically controlled 2/2-valve |
| 120 | trailer supply line |
| 121 | trailer control line, trailer emergency line |
| 130 | spring brake |
| 131 | trailer service brake |
| 195 | electrical pre-control unit 195 |
| 200 and 300 | ABS-valves |
| 230 | diaphragm |
| 250 | trailer assistance control valve of the prior art |
| 292 | pneumatic valve controlled by valve 92 |
| 292a, 292b | control inputs of 292 |
| 293 | pneumatic valve controlled by valve 93 |
| 293a | control input of 293 |
| 293c | diaphragm |
| 294 | pneumatic check valve |
| 294a, 294b | control inputs of 294 |
| 295 | unidirectional check valve |
| 1002 | electro-pneumatic brake system of the prior art |
| 1008 | tractor protection valve (TPV) of the prior art |
| XBR | external brake request signal |
| S1 | first electric control signal |
| S2 | second electric control signal |

What is claimed is:

1. An electro-pneumatic tractor protection valve assembly (8) to be used in a tractor vehicle (1), for supplying a trailing vehicle (3) with a trailer supply pressure and with a trailer brake control pressure for enabling trailer brake processes of a trailer pneumatic brake system (4) of the trailing vehicle (3), the tractor protection valve assembly (8) comprising:

a trailer supply input (84) for receiving at least one supply pressure, a trailer service output (87) for delivering the trailer supply pressure to a trailer supply line (120), a first supply input (81) for receiving a primary driver brake pressure and a second supply input (82) for receiving a secondary driver brake pressure, both the primary driver brake pressure and the secondary driver brake pressure to be supplied from a dual brake valve (14) actuated by a driver brake pedal (10), a vent (86) for venting at least one internal conduit (33) of the electro-pneumatic tractor protection valve assembly (8), a first electrically controlled pneumatic valve (92, 92) to receive a first electric control signal (S1) to start a trailer assistance brake process without actuation of the driver brake pedal (10), and a trailer control output (85) for delivering the trailer brake control pressure to a connected trailer control line (121) for starting a trailer brake process, the trailer control output (85) delivering the trailer brake control pressure in case of at least one of the following situations: the primary brake control pressure being supplied to the first supply input (81), the secondary brake control pressure being supplied to the second supply input (82), or the first electric control signal (S1) signaling an assistance brake process, wherein the electro-pneumatic tractor protection valve assembly (8) further comprises one single casing (8a), in which the first supply input (81), the second supply input (82), the trailer supply input (84), the trailer control output (85), the vent opening (86) and the trailer service output (87) are accommodated, wherein the first electrically controlled pneumatic solenoid valve (92) is a 2/2-solenoid valve configured for receiving the first electric control signal (S1), further comprising a second electrically controlled pneumatic solenoid valve (93) configured for receiving a second electric control signal (S2), wherein the first and second electrically controlled pneumatic solenoid valves (92, 93) are configured for enabling phases of pressure increase, pressure holding and pressure release at the trailer control output (85).

2. The tractor protection valve assembly (8) according to claim 1, further comprising at least a first two-way valve (26) with two inputs (26-1, 26-2) and one output (26-3) for passing through a maximum pressure of two applied pressures to the output (26-3).

3. The tractor protection valve assembly (8) according to claim 2, wherein the highest pressure out of the primary driver brake pressure received at the first supply input (81), of the secondary driver brake pressure received at the second supply input (82), and of a brake control pressure produced for assistance brake processes, is passed through as the trailer brake control pressure.

4. The tractor protection valve assembly (8) according to claim 3, further configured for receiving a pressure signal or supply pressure from a trailer assistance control valve (18) to be actuated by a driver for initiating a selective trailer brake as assistance anti-Jackknife brake function, the pressure signal or supply signal being one of the plurality of pressures.

5. The tractor protection valve assembly (8) according to claim 1, further comprising a tractor protection valve (27) pneumatically controlled by a trailer supply pressure, the tractor protection valve (27) comprising an input port (27-1), an output port (27-2), and a venting port (27-3), the tractor protection valve (27) configured for delivering the trailer brake control pressure to the trailer control output (85) when the trailer supply pressure acts on a control input (27-0) of the tractor protection valve (27).

6. The tractor protection valve assembly (8) according to claim 1, wherein the casing (8a) is a die-cast part comprising bores forming conduits and further bores for inserting internal valves.

7. The tractor protection valve assembly (8) according to claim 1, wherein the trailer service output (87) is connected to the trailer service input (84) via at least one bore of the casing (8a), for passing the supply pressure received at the trailer supply input (84) through and delivering it as trailer brake supply pressure.

8. An electro-pneumatic brake system (2) for a tractor vehicle (1), comprising a tractor protection valve assembly (8) according to claim 1,
a driver brake pedal (10) and a dual brake valve (14) to be actuated by the drivers brake pedal (10),
a primary reservoir (11) and a secondary reservoir (12), which are connected to the first supply input (81) and the second supply input (82) of the tractor protection valve assembly (8) to be passed through the dual brake valve (14) as analog driver's brake pressures in dependence of the actuation of the driver brake pedal (10),
a trailer supply valve (20) connected to the trailer supply input (84),
a trailer supply valve handle (21) to be actuated for opening the trailer supply valve (20) to provide the trailer service output (87) with the trailer brake supply pressure,
an electric control unit (6) outputting the at least one electric control signal (S1, S2) to the first solenoid valve (92) for enabling an assistance brake procedure of the trailing vehicle (3).

9. The electro-pneumatic brake system (2) according to claim 8, further comprising an external driver assistance system (5) outputting external brake request signals (XBR) to the electric control unit (6), the electric control unit (6) outputting the at least first control signal (S1) in dependence of the external brake request signals (XBR).

10. The electro-pneumatic brake system (2) according to claim 9, the external driver assistance system being selected of the group consisting of:
cruise control (CC), automatic cruise control (ACC) or pre-crash system for preventing a crash or lowering the damage in case of a crash.

11. The electro-pneumatic brake system (2) according to claim 8, further comprising a stability control system by selectively actuating brakes, wherein the electric control unit (6) realizes a stability control of the trailing vehicle (3) by outputting the at least first control signal (S1).

12. The electro-pneumatic brake system (2) according to claim 8, further comprising a trailer control valve (18) delivering a pressure signal or primary supply pressure and a trailer control valve handle (19) to actuate the trailer control valve (18) to initiate a selective trailer brake process as Anti-Jackknife process.

* * * * *